United States Patent [19]

Kent et al.

[11] Patent Number: 5,706,361

[45] Date of Patent: Jan. 6, 1998

[54] VIDEO SEED FILL OVER TIME

[75] Inventors: William James Kent, Mill Valley; Robert Norman Jellinghaus, San Francisco; José Madeira de Freitas Garcia, El Cerrito, all of Calif.

[73] Assignee: Autodesk, Inc., San Rafael, Calif.

[21] Appl. No.: 378,663

[22] Filed: Jan. 26, 1995

[51] Int. Cl.⁶ ............................................. G06K 9/00
[52] U.S. Cl. ...................... 382/103; 382/291; 382/294; 382/308
[58] Field of Search ........................ 382/173, 164, 382/282, 283, 103, 308, 291, 294; 395/152; 348/34

[56] References Cited

U.S. PATENT DOCUMENTS

| | | | |
|---|---|---|---|
| 3,840,699 | 10/1974 | Bowerman | 178/6.8 |
| 4,644,397 | 2/1987 | Roy et al. | 358/126 |
| 5,093,869 | 3/1992 | Alves et al. | 382/103 |
| 5,131,049 | 7/1992 | Bloomberg et al. | 382/9 |
| 5,150,426 | 9/1992 | Banh et al. | 382/103 |
| 5,194,969 | 3/1993 | DiFrancesco | 358/463 |
| 5,280,530 | 1/1994 | Trew et al. | 382/100 |
| 5,355,163 | 10/1994 | Tomitaka | 348/234 |
| 5,583,947 | 12/1996 | Florent | 382/103 |

*Primary Examiner*—Yon J. Couso
*Attorney, Agent, or Firm*—Michael J. Hughes; Raymond E. Roberts

[57] ABSTRACT

A method for identifying the limits of an object (10) in a digitized video display (12) having a series of video frames (14). A seed (26) is introduced into an initial object (18a) in an initial frame (14b) and the seed (26) is expanded to define the limits of the initial object (18a). The modified seed (26a) is then superimposed upon a modified object (18b) and a common area (36) is identified. The common area (36) is modified to become yet another iteration of the seed (26) for continuing the operation into yet another frame (14) having a subsequent version of the object (18). The video seed fill over time method (10) proceeds until no common area (36) is identified for a specified number of frames 14.

18 Claims, 3 Drawing Sheets

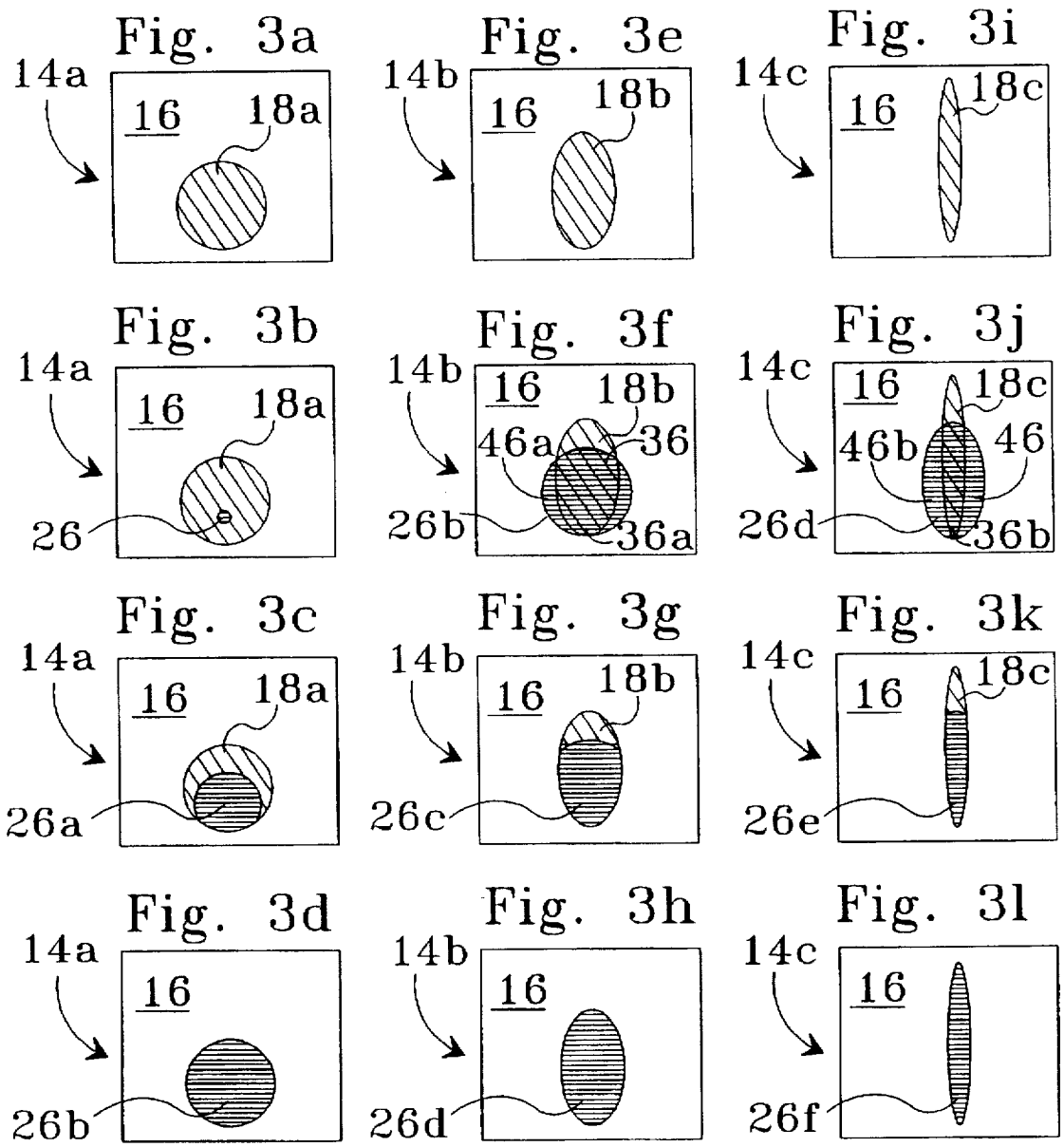

VIDEO SEED FILL OVER TIME

TECHNICAL FIELD

The present invention relates generally to the field of computer assisted video display manipulation and modification, and more particularly to an improved method for identifying and modifying distinct objects within a digitized video image.

BACKGROUND ART

In the process of creating and using digitized video displays, one of the most difficult tasks is that of performing an operation upon a selected object within the video image. Unless the object has been created within a program such that information concerning the limits or the boundary of the object already exist in a form usable by the computer, the object must somehow be isolated such that an operation can be performed on that object and not on the background or surrounding objects.

There exist in the prior art a number of methods for isolating a single object or group of objects within a bit mapped or other digitized video image. The most basic such method is to define a regular block of the image within which the object of concern is located. Such a block may be rectangular, round, or the like. This is the quickest and easiest method, but it suffers from the obvious disadvantage that, in order to include the entirety of the object of interest, it is inevitable that some unwanted background will be included in the operation except in the rare instance wherein the object conveniently happens to match an available block shape.

Another method for defining and isolating an object within a digitized video image involves providing means for an operator to trace the outline of the object and thus to define the interior of such outline as an object block. While this method is time consuming and labor intensive, it does provide satisfactory end results in many applications, and is often used as a fall back method, should more sophisticated methods fail in the application.

Another class of somewhat more sophisticated methods employs the computer to identify the extent and boundaries of an area to be operated upon. A number of such methods exist in the art to define an area. These include, but are not limited to, edge detection routines, definition of an area by color or color spectrum, definition of an area by texture, and the like. In a "seed fill" method, the user selects a point within an image , and the computer expands the selection to include all connected pixels of the same or similar color, or brightness intensity level, or other such defining characteristic. More advanced versions of the seed fill method allow the user to drag a stroke across multiple points within the selected image portion to define a more complex criterion, such as texture or a plurality of pixel colors, and further to define each point on the stroke as a starting point. There are several techniques known in the art for performing such a seed fill operation, and such a process is a part of many commercially available graphics and paint programs, including the Autodesk Animator Pro® program produced by the assignee of this present application.

Once an object or portion of the image has been isolated, as described above, it can be cut out, duplicated, moved within the image, moved to another image, altered in texture, color, brightness or other characteristic, or other such operations can be performed thereon. One option is to use a variation of the seed fill method to fill the defined limits of the object with a specific color, texture, or the like—either replacing or overlaying the preexisting color and/or texture. In this sort of application a very small area containing the desired characteristic (the "seed") is positioned within the defined boundaries or the area of interest, and the computer is then instructed to "grow" the seed outward to the defined limits by modifying surrounding portions of the image, progressively outward in each direction until the boundaries are reached or the defining characteristic is not met, to conform to the example of the "seed". In many cases, such growing will consist of modifying surrounding portions to become exact copies of the seed, although more sophisticated operations can be accomplished according to the same general method. U.S. Pat. No. 5,194,969 issued to DiFrancesco teaches a method for creating a texture seed beginning with an actual digitized video photographic image. U.S. Pat. No. 5,131,049 issued to Bloomberg et al. also teaches an application of the seed fill method.

As can be appreciated in light of the above discussion, for each identifiable area within a video image upon which a modification of color, texture, brightness, or the like is to be performed, unless such modification is to be laboriously accomplished entirely by the operator—as by "painting" over the object using a mouse or other such input device, the area must be defined in such a way that the computer can recognize its limits, and then the operation must be initiated such that the computer can perform the operation within those limits. Clearly, for a "moving" video image consisting of a great many successive "frames", a great deal of time and labor is required to accomplish such operations even with the assistance of the above described computer operations.

To the inventors' knowledge, no reliable method exists in the prior art to achieve a significant economy of scale when performing the above described operations on a series of frames of a moving video image. Indeed, although the modification of moving video images is relatively common place today, the only significant economy of scale appears to be obtained in reference to objects which are stationary in successive frames. The process is still notoriously time consuming and labor intensive.

Clearly, it would be advantageous to transfer more of the burden of the above described operations from the operator to the computer. However, to the inventors' knowledge, no method for doing so has existed in the prior art. All such methods have either provided little real savings in labor, or else have provided unsatisfactory end results in at least many applications, or else have not been practical for use with commonly available computers.

DISCLOSURE OF INVENTION

Accordingly, it is an object of the present invention to provide a method for modifying successive video images according to an operation performed on only a single such image.

It is still another object of the present invention to provide a method for modifying successive video images which can be accomplished primarily by a computer.

It is yet another object of the present invention to provide a method for modifying an object within successive video images even when such object is changing in shape or position in the successive images.

It is still another object of the present invention to provide a method for modifying successive video images which can be used in conjunction with existing image area defining methods and with existing object modification methods.

It is yet another object of the present invention to provide a method for modifying successive video images which is inexpensive to implement.

It is still another object of the present invention to provide a method for isolating an object or other distinctive area within a series of video images such that a subsequent operation can be performed on or with such object or other distinctive area.

It is yet another object of the present invention to provide a method for identifying a defined object within subsequent and/or previous frames of a moving video image.

Briefly, the preferred embodiment of the present invention is an iterative method, accomplished under computer control, wherein an initial area is defined and a seed fill operation performed thereon to complete the definition of the limits of the area. After the limits of the area are defined in the initial frame, the points defined by the seed fill in the initial frame are used as seeds for filling the next subsequent and/or next previous frame. Seeds which are on top of pixels outside the defining criterion set do nothing. Seeds which are inside pixels, or groups of pixels, which meet the defining criterion are grown as is customary for a conventional seed fill. The process continues until a frame is encountered wherein no pixel or group of pixels are both within the previous fill area and defined by the defining criterion. In an equally preferred alternate embodiment of the invention, the process is allowed to continue according to predefined terms even beyond a point wherein a frame with no pixel or group of pixels is both within the previous fill area and defined by the defining criterion. In both the first preferred embodiment and the equally preferred alternate embodiment, the inventive video seed fill over time process can be caused to proceed forward and/or backward in a series of video frames.

An advantage of the present invention is that an operator need only perform an operation on a single frame to accomplish a like operation on a plurality of frames.

A further advantage of the present invention is that the inventive method can be accomplished with a minimum of operator intervention.

Yet another advantage of the present invention is that objects can be isolated within consecutive video frames even when such objects are changing in shape and or position within the frames.

Still another advantage of the present invention is that the method can be accomplished on existing and future image formats.

Yet another advantage of the present invention is that the method can be used in conjunction with existing and future image manipulation apparatus and methods.

Still another advantage of the present invention is that it is inexpensive to implement.

Yet another advantage of the present invention is that it will rapidly isolate an image in a series of frames.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 3 comprising 3(a) through 3(l) is a series of video frames progressively modified according to the flow chart of FIG. 1.

BEST MODE FOR CARRYING OUT INVENTION

The best presently known mode for carrying out the invention is a computer implementing the inventive method for isolating objects within a series of digitized video images. The predominant expected usage of the inventive video seed fill over time method is in the production of moving video presentations, such as multimedia productions, video games and motion picture special effects, particularly in the production of lengthy or complex productions where time savings and the quality of output are important.

Figure 1:
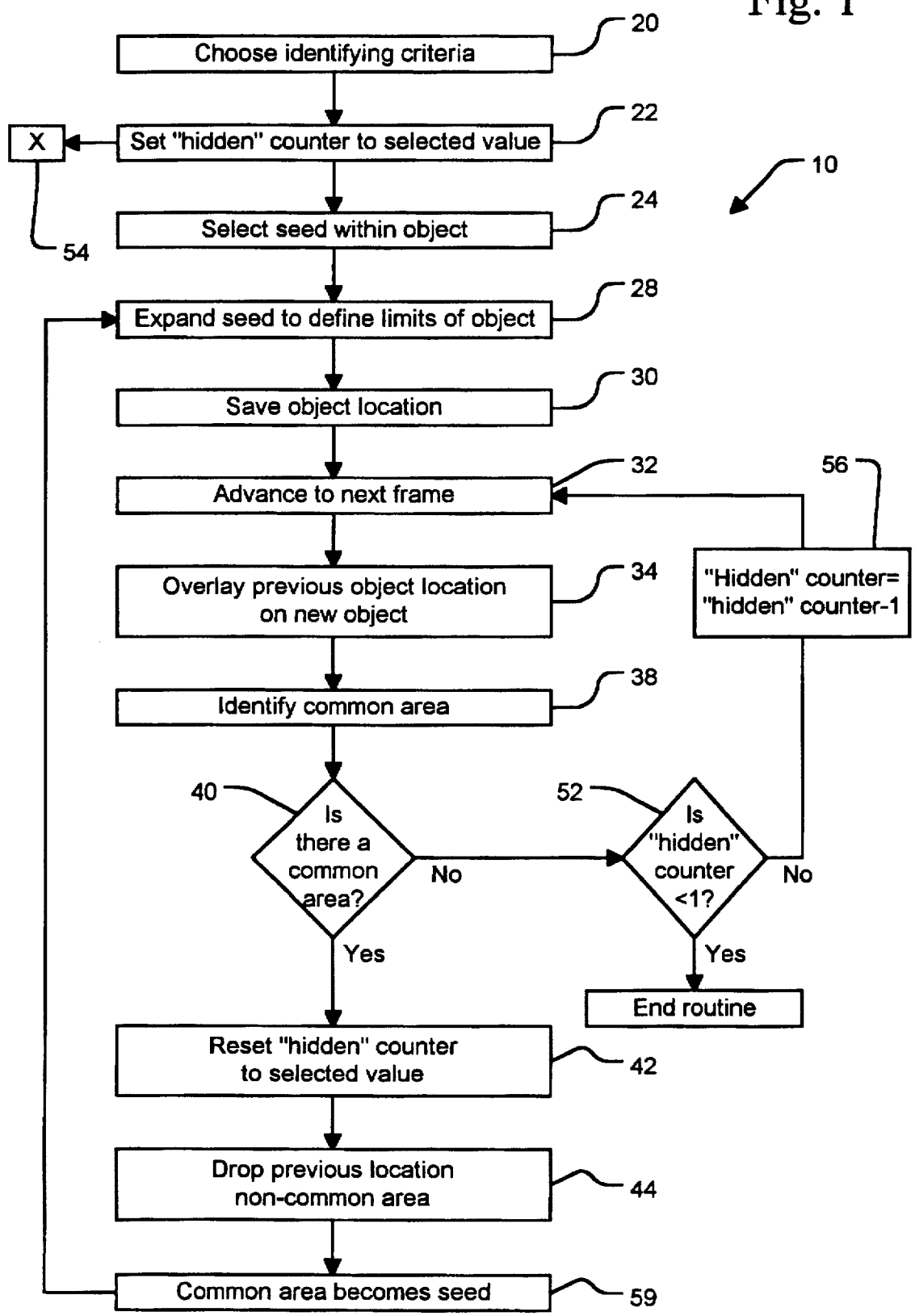
FIG. 1 is a flow chart depicting the best presently known embodiment of the present inventive method.
Figure 2:
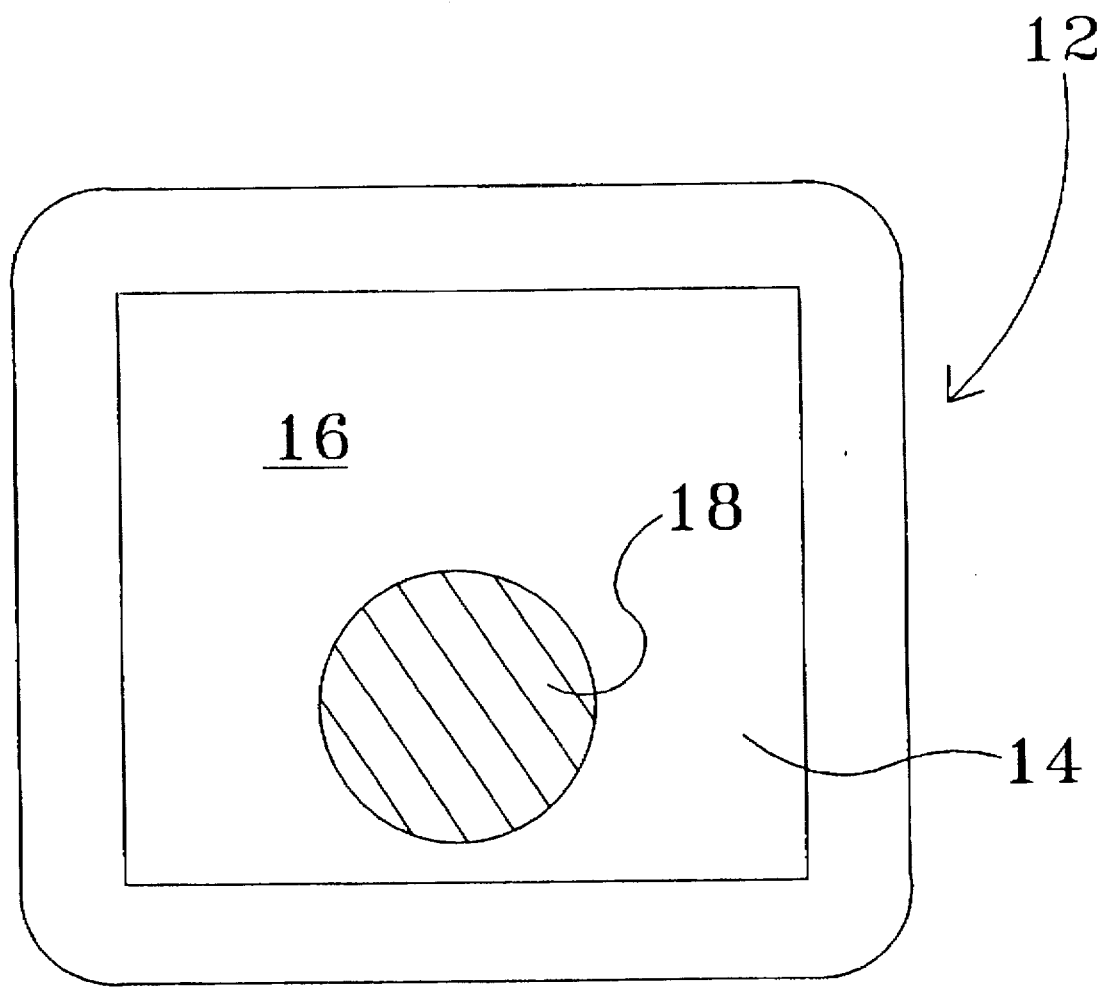
FIG. 2 is a display screen with an exemplary video frame displayed thereon.

The video seed fill over time method is illustrated in a flow chart in the view of FIG. 1, and is designated therein by the general reference character 10. FIG. 2 is a diagrammatic representation of a video display 12 (as viewed on a computer display screen). In the view of FIG. 2, a "frame" 14 of a video image is displayed on the video display 12. In order to clearly disclose the present inventive process, the frame 14 is quite simple. The exemplary frame 14 has a plain (white) background 16 with an object 18 thereon. The object 18 in the example of FIG. 2 is a simple shape which is representative of essentially any distinguishable portion of a video image. The object 18 in the example of FIG. 2 is diagonally cross hatched to indicate that it has been arbitrarily assigned the color green for purposes of this example. The object 18 may be moving and/or changing over time as the video display 12 is updated. FIG. 3 is a representation of a series of frames 14. A first frame 14a is depicted in FIG. 3a as being, initially, as described above in relation to FIG. 2 with an initial object 18a on the background 16.

Returning now to the flow chart of FIG. 1, a "choose identifying criteria operation" 20 is, in the best presently known embodiment 10 of the present invention, performed by the user in conjunction with applicable computer routines. As previously stated herein, there exist in the prior art methods for identifying portions of a video image according to color, brightness, simulated texture, or other criterion or combinations thereof. The present inventive video seed fill over time method 10 can be used in conjunction with essentially any such identifying criterion. For the purpose of the present example, the simple criterion "color" will be used. In the simple example of FIG. 2 and FIG. 3, the object 18 is of the single color (green). As previously discussed herein in relation to the prior art, there exist in the art more sophisticated methods which can define objects according to a combination of colors, or color pattern, or the like. However, the use of a more complex identifying criterion would make the example of FIG. 3 unnecessarily complex without adding to an understanding of the present invention.

A "set 'hidden' counter to selected value" operation 22 is also, optionally, performed by the operator. When used, the "hidden" counter value will be the number of frames 14 (FIG. 3) beyond which the present inventive method will proceed under certain conditions, as will be discussed in more detail hereinafter. According to the best presently known embodiment 10 of the present invention, the user then performs a "select seed within object" operation 24. This is accomplished by "clicking- on any area within the object 18.

In the view of FIG. 3b, a seed 26 is shown within the initial object 18a. The size of the seed 26 is exaggerated in the view of FIG. 3b for the purpose of illustration, since the seed 26 may initially consist of only a single pixel (in the present example wherein a single color is used as the selection criterion).

Returning now to the flow chart of the best presently known embodiment 10 of the present invention, as illustrated in FIG. 1, an "expand seed to define limits of object" operation 28 is next accomplished. It should be noted that, although many of the operations of the present inventive method might be performed by an operator, by a computer, or by some combination thereof, it is expected that in the best presently known embodiment 10 of the present invention, an operator will be involved directly in the "choose identifying criteria" operation 20, the "set 'hidden' counter to selected value" operation 22 and the "select seed within object" operation 24, while the "expand seed to define limits of object" operation 28 and subsequent operations discussed hereinafter will be accomplished essentially without operator intervention. In the view of FIG. 3c it can be seen that a first modified seed 26a is expanding to define the limits of the initial object 18a. In the view of FIG. 3d, the limits of the object 18a are defined by a second modified seed 26b such that the area of the background 16 having thereon the second expanded seed 26b is that area having the initial object 18a thereon initially in the initial video frame 14a. The location (that is, that portion of the video display 12 (FIG. 1) which is assigned to the second modified seed 26b) is recorded (in computer memory, according to the present example) in a save object location operation 30.

It should be noted that, as used herein, the term "seed" has a somewhat different meaning than has been 38 associated with the term in the prior art. In the prior art, "seed" has generally been associated with an initially small area which "grows" to fill a larger defined area—as might be expected from the common definition of the word. However, in the present inventive video seed fill over time method 10, the initially small seed 26 does grow but, unlike in the prior art, it continues through successive modifications (as will be discussed hereinafter) without necessarily returning to the small initial state. Although, according to the present inventive method 10, the seed 26 does grow and change over time, it does not lose its essential character. Therefore, as used herein, the term "seed" will denote the initial seed 26 and modifications thereof.

FIG. 3e is a next subsequent frame 14b having therein a first altered object 18b. The first altered object 18b is not a different entity than the initial object 18a. Rather the first altered object 18b is the object 18 (FIG. 2) as seen in the next subsequent frame 14b of the moving video display 12. An "advance to next frame" operation 32 (FIG. 1) causes the inventive video seed fill over time method 10 to operate on another frame 14—in this case, the second frame 14b.

Returning again to the flow chart of FIG. 1, in the best presently known embodiment 10 of the present inventive method, an "overlay previous object location on new object" operation 34 causes the second modified seed 26b to be overlaid on the first modified object 18b. In the example of FIG. 3f, the superimposition of the second modified seed 26b on the first modified object 18b produces a first common area 36a (depicted as having both diagonal and horizontal hatching in the view of FIG. 3f). As will be discussed in more detail hereinafter, in some instances, the area and position of the second modified seed 26b may be identical to those area defining features of the first modified object 18b, such that both define the same location on the background 16. In other instances, the second modified seed 26b might be entirely within the bounds of the first modified object 18b or, alternatively, the first modified object 18b might be entirely within the bounds of the second modified seed 26b. In the example of FIG. 3f, first modified object 18b and the second modified seed 26b form an overlapping set of individual portions of the background 16. Therefore, it will be recognized that, although the first common area 36a is included in the example of FIG. 3f, whether or not the first common area exists in any given frame 14 is a function of the video upon which the present inventive method is performed. Operation of the inventive video seed fill over time method 10 in instances wherein the first common area 36a might not exist will be discussed in greater detail hereinafter.

Returning again to the flow chart of FIG. 1, in the best presently known embodiment 10 of the present invention, an "identify common area" operation 38 identifies the first common area 36a (if present), and an "is there a common area" decision operation 40 branches the present inventive method 10 dependent upon the existence of the first common area 36a.

When, as in the present example of FIG. 3f, the first common area 36a does exist, the best presently known embodiment 10 of the present inventive method proceeds to a "reset 'hidden' counter to selected value" operation 42. The "reset 'hidden' counter to selected value" operation 42 is an optional step which will be discussed hereinafter in relation to instances wherein the first common area 36a does not exist.

In a "drop previous location non-common area" operation 44, the second modified Seed 26b (FIG. 3f) is modified, as illustrated in the view of FIG. 3g, by eliminating a first excess area(s) 46a (the first excess areas 46a being those portions of the first modified seed 26b which do not coincide with the initial object 18a. In effect, the first common area 36a (FIG. 3f) is modified to become a third modified seed 26c, as is indicated in FIG. 3g by the fact that the third modified seed 26b has only horizontal hatching (as used herein to designate the seed 26 and subsequent iterations thereof), with the relevant diagonal hatching of FIG. 3f having been eliminated. This is listed in the flow chart of FIG. 1 as a "common area becomes seed" operation 50. It should be noted that the "drop previous location non-common area" operation 44 and the "non-common area becomes seed" operation 46 may be combined—the object being simply that the first union area 36a of FIG. 3f becomes the second modified seed 26c of FIG. 3g.

As illustrated in the flow chart of FIG. 1, in the best presently known embodiment 10 of the present invention, following the "common area becomes seed" operation 50, the method loops back to the "expand seed to define limits of object" operation 28. FIG. 3h depicts a third modified seed 26d, which is the third modified seed 26c expanded to the limits of the first modified object 18b (FIG. 3e). Continuing with the present example, in the "save object location" operation 30, the location of the third modified seed 26d is recorded then, in the "advance to next frame" operation 32, the inventive video seed fill over time method 10 is caused to operate on another frame 14—in this case, a third frame 14c (FIG. 3i). As shown in FIG. 3j, the "overlay previous object location on new object" operation 34 superimposes the third modified seed 26d on the second modified object 18c forming a second common area 36b and two (in the example of FIG. 3j) of second excess areas. The second common area 36b is identified in the "identify union area" operation 38. Since, as can be seen in the view of FIG. 3j, in the present example there is a common area, the video seed fill over time method 10 proceeds through the "is there a common area?" decision operation, through the "reset 'hidden' counter to selected value" operation 42 and to the "drop previous location non-common area" operation 44 and the "common area becomes seed" operation 50, wherein the second common area 36b (FIG. 3j) is converted to a fourth modified seed 26e (FIG. 3k). Again, the flow chart of FIG. 1 shows that the example of the best presently known embodiment 10 of the present inventive method loops back to the "expand seed to limits of object" operation 28, wherein the fourth modified seed 26e is expanded to the limits of the second modified object 18c (FIG. 3i) to become a fifth modified seed 26f (FIG. 3l).

One skilled in the art will recognize that the flow chart of FIG. 1 indicates that the best presently known embodiment 10 of the present inventive method 10 continues, as previously described herein, to repetitively operate from the "expand seed to define limits of object" operation 28 through the "common area becomes seed" operation 50 until the "is there a common area?" decision operation 40 determines that there is no common area 46, at which time the inventive video seed fill over time method 10 proceeds to a "is 'hidden' counter less than one?" decision operation 52.

As previously mentioned herein, the "set 'hidden' counter to selected value" operation 22 and the "reset" 'hidden' counter to selected value" operation 42 are optional steps which may be eliminated in simpler applications of the present inventive method. When used, in the "set 'hidden' counter to selected value" operation, the operator will decide how many times the video seed fill over time method 10 will perform the loop "advance to next frame" operation 32, overlay previous object location on new object" operation 34, and "identify common area" operation 38 when there is, in fact, no common area 36. That is, a hidden counter 54 is set to dictate how many frames 14 (FIG. 2) the video seed fill over time method 10 will advance while there continues to be no common area 36 (FIG. 3) each time the "is there a union area?" decision operation 40 is encountered.

From the "is 'hidden' counter less than one?" decision operation, when the hidden counter 54 is not less than one, the value of the hidden counter 54 is reduced by one in a "'hidden' counter equals 'hidden' counter minus one" operation 56. When and if a common area 36 (FIG. 3) is again identified in the "identify common area" operation 38, the "is there a common area?" decision operation 40 will cause the video seed fill over time method 10 to proceed (again) to the "reset 'hidden' counter to selected value" operation 42, wherein the hidden counter 54 is reset to that value initially selected by the operator in the "set 'hidden' counter to selected value" operation 22. Thereafter, the best presently known embodiment 10 of the present inventive method will proceed as previously discussed herein. Alternatively, when the "is 'hidden' counter less than one?" decision operation determines that the decision counter 54 is less than one, the video seed fill over time method 10 proceeds to an "end routine" operation 58, wherein control is returned, depending upon the application, to the operator or whatever superior routine under which the video seed fill over time method 10 might be running.

One skilled in the art will recognize that the hidden counter 54 and operations relating thereto constitute a simple resettable loop counter. The example of the hidden counter 54 discussed herein in relation to FIG. 1 and the best presently known embodiment 10 of the present inventive method is certainly not the only method for accomplishing the purpose of this optional part of the present inventive method. The hidden counter 54 is simply a device for allowing the video seed fill over time method 10 to operate on an object 18 even when the object 18 might be obscured for a few frames 14, such as when the object 18 is a person and an automobile might pass briefly in front of that person in the video display 12. One skilled in the art of programming will readily adapt more sophisticated substitutes for the hidden counter 54, should the application require such.

It should be noted that, although the seed 26 is depicted in FIG. 3 with horizontal hatching (indicating the color blue), this is arbitrarily chosen for the purposes of the example discussed herein. Indeed, it is not necessary that there be any visual (operator discernible) indication of the seed 26 at all. Alternatively, it is possible in some instances—for example, where the operation to be performed on the object 18 is a simple color change—for an additional operation (or operations) to be integrated into the video seed fill over time method 10. An illustration of this example would be where the end objective might be to change each of the objects 18a, 18b and 18c in FIG. 3 from green to blue, the original states of such objects 18a, 18b and 18c could be substituted in the frames 14a, 14b and 14c with the (blue) seeds 26b, 26d and 26f respectively. In such an example, inventive video seed fill over time method 10 for identifying the limits of the object 18 over time in the moving video display 12 (FIG. 2) would simultaneously act upon the object 18. Alternatively, in many applications, it is anticipated that the inventive video seed fill over time method 10 will be used simply to establish a record of the locations of the seeds 26 which are configured whenever the "save object location" operation 30 is encountered. For example, where the objective is to remove the objects 18 from the frames 14 and place them in some other (alternative) video display (not shown) the alternative video display may not even be selected or known when the inventive video seed fill over time method 10 is performed.

Various modifications may be made to the invention without altering its value or scope. For example, to account for instances wherein the object 18 has moved so much that there is no common area of the background 16 covered by the object 18 in two successive frames, the seed 26 could be allowed to expand (within preset limits) somewhat beyond the bounds of the (previous position and shape) of the object 18 in pursuit of the union area 36.

Another variation contemplated by the inventors is to allow the seed 26 to proceed backward (or forward and backward) in time, such that frames previous to the initial frame 14a could be operated upon instead of, or in addition to, the subsequent frames 14b and 14c.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive video seed fill over time method is intended to be widely used in the production and modification of moving picture video presentations. The predominant current usages are for the modification of video images in the production of commercial video presentations, video games, video animations and conventional motion pictures. The video seed fill over time method of the present invention may be utilized in any application wherein conventional methods for identifying the limits of an object over time in a video presentation are used. Primary areas of improvement are in the reduced need for operator invention and the improved precision of object identification.

The present inventive video seed fill over time method is intended to be used as a "tool" available to a computer operator engaged in the production or modification of video presentations. As with all such tools, it will be up to the operator to decide if the present inventive method is the correct tool for a particular job or part of a job. It is anticipated that the video seed fill over time method will be made available to the operator by means of an icon upon which the operator can "click", a pull down menu, or the like.

As an example of usage, it might be that the operator has a portion of a video presentation with an identifiable object—such as a red automobile—therein. The operator could choose to identify the red automobile within a series of frames of the video. Having identified the object the operator could choose to change the color of the automobile or perform another such operation thereon. The operator could also choose to "cut and paste" the identified automobile from the video and place it in another video. In a more sophisticated application, the operator could choose to just "cut" the automobile from the video (and replace it in each frame with the correct background—which could be identified through other frames of the video).

Since the video seed fill over time method of the present invention may be readily produced and integrated into conventional animation and paint programs, video production programs and the like, it is expected that it will be acceptable in the industry as a substitute for and/or addition to conventional object identification methods. For these and other reasons, it is expected that the utility and industrial applicability of the invention will be both significant in scope and long-lasting in duration.

What is claimed is:

1. A method for identifying an object within a plurality of frames of a moving picture video, comprising:
   identifying the object within a first frame of the video according to a distinguishing characteristic of the object and further identifying a location of the object;
   superimposing the location of the object within a second frame of the video;
   identifying a common area within the second frame of the video;
   expanding the common area to identify the location of a modified object within the second frame of the video;
   superimposing the location of the modified object within a third frame of the video;
   identifying a second common area within the third flame of the video; and
   expanding the common area to identify a second modified object within the third frame of the video.

2. The method of claim 1, wherein:
   the distinguishing characteristic is color.

3. The method of claim 1, wherein:
   the distinguishing characteristic is brightness.

4. The method of claim 1, wherein:
   the distinguishing characteristic is texture.

5. The method of claim 1, wherein:
   said common area is that portion of the second frame having both the distinguishing characteristic and the location of the object.

6. A method for isolating an object through a series of video frames, comprising:
   a choosing an identifying criterion;
   b placing a seed within the object in an initial frame;
   c1 expanding said seed to define the limits of the object according to the identifying criterion;
   c2 saving the location of the seed;
   d advancing to a next frame;
   e superimposing the seed on said next frame;
   f identifying a common area having both the seed and the identifying criterion; and
   g modifying the seed to coincide with the common area.

7. The method of claim 6, and further including:
   repeating steps c1 through g until no common area can be identified in step f.

8. The method of claim 6, and further including:
   repeating steps c1 through g until no common area can be identified in step f, and then repeating steps d through f a predetermined number of times or else until a common area is identified in step f.

9. The method of claim 6, wherein:
   the next frame is immediately subsequent to the initial frame in the series of video frames.

10. The method of claim 6, wherein:
    the next frame is subsequent to the initial frame in the series of video frames.

11. The method of claim 6, wherein:
    the next frame is previous to the initial frame in the series of video frames.

12. An object defining system for defining a portion of a moving picture video image, comprising:
    display means for displaying a first frame of a computer image;
    selection means for an operator to place a seed upon the first frame; and
    a computer program including operations for;
       a expanding the seed to define an object;
       b redefining the seed to correspond to the location of the object and saving a location of the seed;
       c advancing to a next frame;
       d overlaying the location of the seed on the next frame;
       e identifying a common area, the common area being any portions of the next frame which are shared by the object and the seed; and
       f redefining the seed to correspond to the common area.

13. The object defining system of claim 12, wherein:
    the computer program is caused to repeat steps a through f until no common area is identified in step e.

14. The object defining system of claim 12, wherein:
    the computer program is caused to repeat steps a through f even after no common area is identified in step e.

15. The object defining system of claim 12, wherein:
    the seed is defined according to a characteristic of that portion of the first frame upon which the operator places the seed.

16. The object defining system of claim 15, wherein:
    the characteristic of that portion of the first frame upon which the operator places the seed is the color of that portion of the first frame.

17. The object defining system of claim 15, wherein:
    the seed is defined according to a single color.

18. The object defining system of claim 15, wherein:
    the seed is initially defined according to a characteristic of the object.

* * * * *